United States Patent
Sato

(10) Patent No.: US 7,123,784 B2
(45) Date of Patent: Oct. 17, 2006

(54) ELECTRO-OPTIC MODULATOR WITH PARTICULAR DIFFUSED BUFFER LAYER

(75) Inventor: Masahiro Sato, Sendai (JP)

(73) Assignee: Seikoh Giken Co., Ltd., Matsudo (JP)

( * ) Notice: Subject to any disclaimer, the term of this patent is extended or adjusted under 35 U.S.C. 154(b) by 263 days.

(21) Appl. No.: 10/827,926

(22) Filed: Apr. 19, 2004

(65) Prior Publication Data

US 2004/0228565 A1 Nov. 18, 2004

(30) Foreign Application Priority Data

Apr. 24, 2003 (JP) ............................ 2003-119721

(51) Int. Cl.
*G02F 1/035* (2006.01)
(52) U.S. Cl. ........................................................ 385/2
(58) Field of Classification Search .................. 385/2
See application file for complete search history.

(56) References Cited

U.S. PATENT DOCUMENTS

| | | | |
|---|---|---|---|
| 5,404,412 A * | 4/1995 | Seino et al. ................... 385/2 |
| 5,679,291 A | 10/1997 | Hakogi | |
| 5,680,497 A | 10/1997 | Seino et al. | |
| 5,817,368 A | 10/1998 | Hashimoto | |
| 6,069,729 A * | 5/2000 | Gill et al. ................... 359/245 |
| 6,480,633 B1 * | 11/2002 | Fleming et al. ................. 385/2 |
| 6,522,794 B1 * | 2/2003 | Bischel et al. .................. 385/4 |
| 6,535,321 B1 * | 3/2003 | Wang et al. ................. 359/260 |
| 6,710,366 B1 * | 3/2004 | Lee et al. ..................... 257/14 |
| 6,741,782 B1 * | 5/2004 | Berini ........................ 385/130 |
| 6,760,493 B1 * | 7/2004 | Pruneri et al. .................. 385/8 |
| 7,016,554 B1 * | 3/2006 | Mitchell et al. ................ 385/1 |
| 2003/0138178 A1 * | 7/2003 | Kimerling et al. ............. 385/2 |

FOREIGN PATENT DOCUMENTS

| | | |
|---|---|---|
| JP | 62-073207 A | 4/1987 |
| JP | 05-257105 A | 10/1993 |
| JP | 8-313577 A | 11/1996 |
| JP | 9-197357 A | 7/1997 |
| JP | 10-054964 A | 2/1998 |

* cited by examiner

*Primary Examiner*—Frank G. Font
*Assistant Examiner*—Timothy Rude
(74) *Attorney, Agent, or Firm*—Frishauf, Holtz, Goodman & Chick, P.C.

(57) ABSTRACT

An electro-optic modulator (300) comprises a substrate (310) made of a material which has an electro-optic effect and a pyroelectric effect. In the substrate (310), an optical waveguide (320) is formed to have at least a pair of optical paths. On the substrate (310) and on the optical waveguide (320), a transparent buffer layer (330) is formed to cover the optical waveguide (320). On the buffer layer (330), first and second electrodes (341, 342) are formed so that the first and the second electrodes (341, 342) are arranged to cause refractive index changes in the pair of optical paths in response to electrical fields surrounding the electro-optic modulator (300). The buffer layer (330) is a mutual diffusion layer. The mutual diffusion layer is made from laminated films comprised of at least one transparent insulator film and at least one transparent conductor film but has no clear boundary between the transparent insulator film and the transparent conductor film.

10 Claims, 6 Drawing Sheets

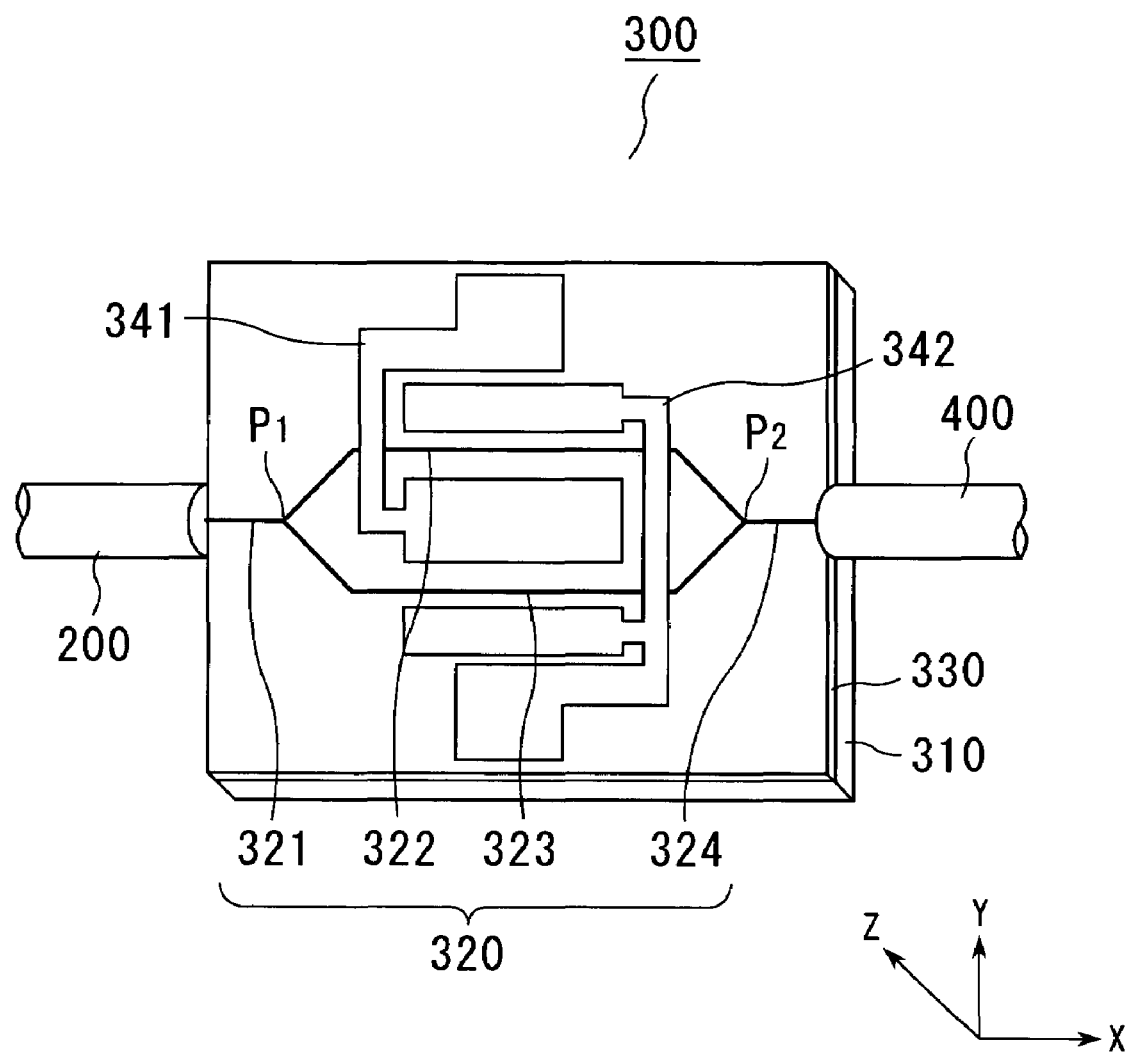
F I G. 2

ELECTRO-OPTIC MODULATOR WITH PARTICULAR DIFFUSED BUFFER LAYER

BACKGROUND OF THE INVENTION

This invention relates to an electro-optic modulator. For example, the electro-optic modulator can be used as a sensor head in an electrical-field sensor for detecting the electrical field surrounding the sensor head.

A known electro-optic modulator is disclosed in JP-A H08-313577, the disclosure of which is incorporated herein by reference. The electro-optic modulator is fabricated in an electro-optic substrate made of LiNbO$_3$. An optical waveguide comprises a pair of optical paths and is formed in the substrate. On or above the optical waveguides, electrodes are arranged to cause refractive index changes in the pair of optical paths in response to electrical fields surrounding the electro-optic modulator. By using the refractive index changes, the electro-optic modulator can detect and convert the electrical fields into light intensity changes.

The substrate material of LiNbO$_3$ also has a pyroelectric effect. The pyroelectric effect of the substrate induces undesirable distribution of electrical charges depending upon the ambient temperature. The undesirable distribution of electrical charges provides undesirable electrical fields and causes significant errors. The detail of the problem caused by the undesirable distribution of electrical charges is described in JP-A H09-197357, the disclosure of which is incorporated herein by reference.

To solve the undesirable distribution of electrical charges, JP-A H08-313577 has proposed applying a conductive resin material onto the electrodes so that a low conductive film or an inferior-conductive film is formed over the electrodes. However, it is difficult to form the low conductive film of uniform thickness to provide the same conductivity over the film.

JP-A H09-197357 has proposed another approach, in which a buffer layer is a mixture layer of transparent insulator material and transparent conductive material. However, it is also difficult for the mixture layer to have a uniform resistance in a plane.

SUMMARY OF THE INVENTION

It is an object of the present invention to provide an electro-optic modulator which has an improved sheet resistance, i.e. improved distribution of the resistance in a plane.

The present invention provides an electro-optic modulator which has an improved sheet resistance, i.e. improved distribution of the resistance in a plane.

According to one aspect of the present invention, an electro-optic modulator comprises: a substrate made of a material which has an electro-optic effect and a pyroelectric effect; an optical waveguide which comprises at least a pair of optical paths and is formed in the substrate; a buffer layer which is transparent and is formed on the substrate and on the optical waveguide, wherein the buffer layer is a mutual diffusion layer made from laminated films which comprise at least one transparent insulator film and at least one transparent conductor film; and electrodes which are formed on the buffer layer and are arranged to cause refractive index changes in the pair of optical paths in response to electrical fields surrounding the electro-optic modulator.

The mutual diffusion layer of the buffer layer has an improved sheet resistance in comparison with the prior arts mentioned above and can be easily fabricated.

According to one aspect of the present invention, an electro-optic modulator is fabricated as follows. An optical waveguide is formed in a substrate, wherein the substrate is made of a material which has an electro-optic effect and a pyroelectric effect, and the optical waveguide comprises at least a pair of optical paths. At least one transparent insulator film and at least one transparent conductor film are laminated to form laminated films on the substrate and on the optical waveguide. The laminated films are mutually diffused into each other to form a transparent buffer layer on the substrate and on the optical waveguide. On the buffer layer, electrodes are formed so that the electrodes are arranged to cause refractive index changes in the pair of optical paths in response to electrical fields surrounding the electro-optic modulator.

An appreciation of the objectives of the present invention and a more complete understanding of its structure and a fabrication method thereof may be had by studying the following description of the preferred embodiment and by referring to the accompanying drawings.

BRIEF DESCRIPTION OF THE DRAWINGS

FIG. 2 is a schematic perspective view showing the electro-optic modulator of FIG. 1;

DESCRIPTION OF PREFERRED EMBODIMENTS

Figure 1:
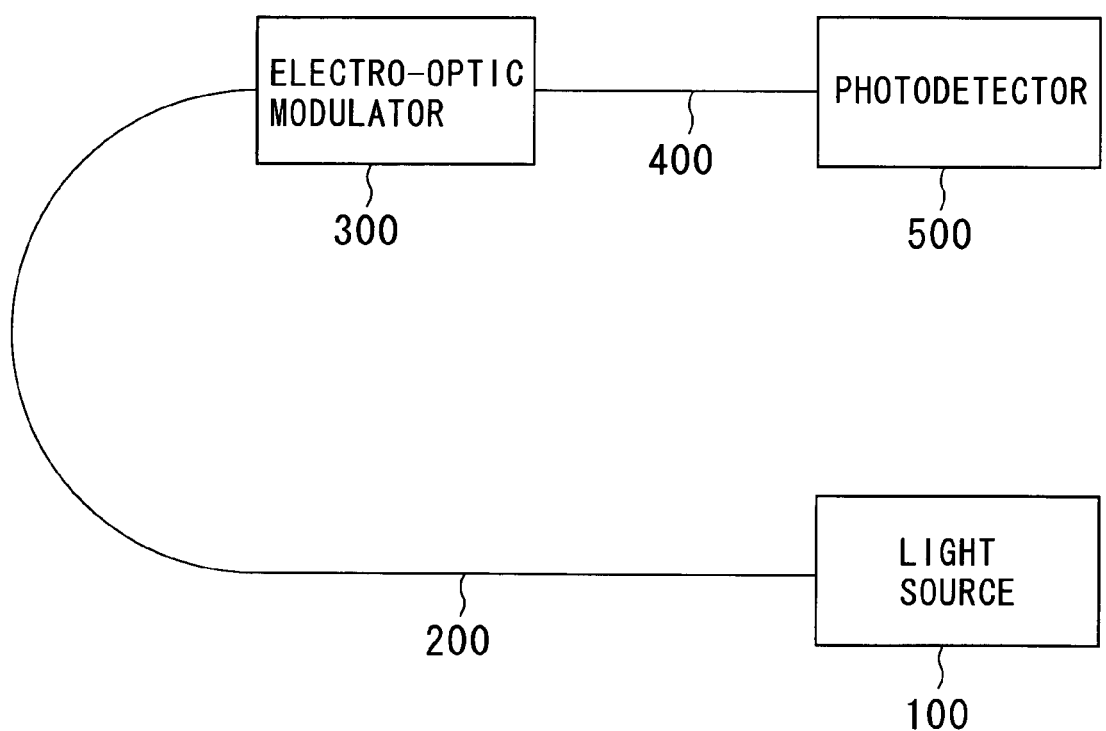
FIG. 1 is a schematic overview showing an electrical-field sensor which comprises as a sensor head thereof an electro-optic modulator according to a first embodiment of the present invention.

With reference to FIG. 1, an electro-optic modulator 300 according to a first embodiment of the present invention is used in an electrical-field sensor, which further comprises a light source 100, a first optic fiber 200, a second optic fiber 400, and a photodetector 500.

The electro-optic modulator 300 comprises an integrated optic interferometer. In detail, the integrated optic interferometer illustrated in FIG. 2 is a Mach-Zehnder interferometer. Alternative integrated optic interferometers may be used as well. For example, an alternative integrated optic interferometer may be a Michelson interferometer.

The integrated optic interferometer is fabricated in a substrate 310. The substrate 310 is made of an electro-optically active material. The invention is particularly effective when the substrate material not only has the electro-optic effect, but also has a pyroelectric effect in addition. In this embodiment, the material of the substrate 310 is LiNbO$_3$. The substrate 310 is obtainable by cutting a crystal material along a plane perpendicular to an X axis of the crystal material. The material of the substrate 310 may be another material, such as LiTaO$_3$.

In the substrate 310, an optical waveguide 320 is formed by diffusion. In this embodiment, the optical waveguide 320 is made of Ti but may be made of V, Ni or Cu in the case where the substrate 310 is made of LiNbO$_3$. In the case where the substrate 310 is made of LiTaO$_3$, the optical waveguide 320 may be made of Cu, Nb or Ti. When another substrate material is used, the material for the optical waveguide 320 may appropriately selected by the person skilled in the art.

As shown in FIG. 2, the optical waveguide 320 has an input section 321, which branches into first and second optical paths 322, 323 at a Y-junction point P$_1$. The first and the second optical paths 322, 323 have one and the same length in this embodiment. This means that the first and the second optical paths 322, 323 have one and the same optical length if the ambient conditions thereof are same. The first and the second optical paths 322, 323 merge together at a Y-merge point P$_2$ and are connected to an output section 324. The first optic fiber 200 is butt-coupled to the input section 321 of the optical waveguide 320. The second optic fiber 400 is also butt-coupled to the output section 324 of the optical waveguide 320.

Figure 3:
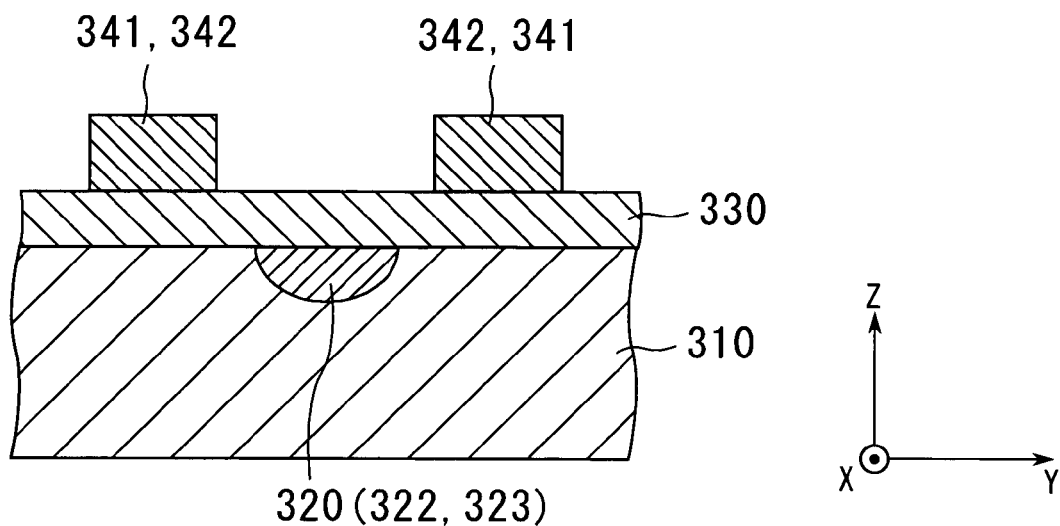
FIG. 3 is a partial, enlarged, cross-sectional view showing the electro-optic modulator of FIG. 2.

With reference to FIGS. 2 and 3, a buffer layer 330 is formed on the substrate 310 and on the optical waveguide 320 so that the optical waveguide 320 is covered by the buffer layer 330. In this embodiment, the buffer layer 330 is transparent in accordance with a wavelength in which the electro-optic modulator 300 is used. The buffer layer 330 of this embodiment has a refractive index smaller than the optical waveguide 320. In addition, the buffer layer 330 according to this embodiment is a mutual-diffusion layer which can be made from laminated films which comprises a transparent insulator film and a transparent conductor film. Although the laminated films are used to form the mutual diffusion layer, there is no clear boundary between the transparent insulator film and the transparent conductor film in the formed buffer layer 330 because of the mutual diffusion between the transparent insulator film and the transparent conductor film. The buffer layer 330 according to the first embodiment has a preferred sheet resistance ranging from $10^6$ to $10^7$ ohms per square. In addition, the buffer layer 330 substantially has a uniform resistance in a plane. The buffer layer 330 has a distribution of sheet resistances in a thickness direction of the buffer layer 330, i.e., a Z-direction shown in FIG. 3. In other words, the buffer layer 330 according to the present embodiment has a smooth changing profile along the thickness direction of the buffer layer 330 in accordance with a fabrication method of the electro-optic modulator of the present embodiment. The method of forming the buffer layer 330 according to the first embodiment will be explained afterwards.

On the buffer layer 330, first and second electrodes 341, 342 are formed. The material of the first and the second electrodes 341, 342 is, for example, Au, Al or Cu.

The first and the second electrodes 341, 342 are arranged to cause refractive index changes in the optical waveguide 320, especially, the first and the second optical paths 322, 323 thereof, in response to electrical fields surrounding the electro-optic modulator 300. The first electrode 341 is supplied with a reference voltage, e.g., a ground voltage. The second electrode 342 is supplied with a voltage according to the electrical fields surrounding the electro-optic modulator 300. In cooperation with the reference voltage supplied for the first electrode 341, the voltage supplied for the second electrode 342 forms electrical fields which act on the first and the second optical paths 322, 323 of the optical waveguide 320 in opposite directions along a Y-direction shown in FIG. 2. This results in the refractive index changes in the first and the second optical paths 322, 323 of the optical waveguide 320. Thus, the first and the second electrodes 341, 342 change the refractive index changes in the first and the second optical paths 322, 323 of the optical waveguide 320 if the second electrode 342 is supplied with a voltage according to the electrical fields surrounding the electro-optic modulator 300.

A light beam emitted from the light source 100 is input into the electro-optic modulator 300 through the first optic fiber 200. The light beam passes through the input section 321 of the optical waveguide 320 and is divided into two light beams at the Y-junction point P$_1$. The divided light beams propagate through the first and the second optical paths 322, 323, respectively. At that time, if the refractive index changes occur in the first and the second optical paths 322, 323 in response to the electrical field surrounding the electro-optic modulator 300, a phase difference occurs between the light beams propagating through the first and the second optical paths 322, 324, in correspondence with the electrical fields. The light beams having the phase difference are coupled together at the Y-merge point P$_2$ so that the light beams interfere with each other. This results in that the coupled beam has the intensity variation in accordance with the phase difference. The coupled beam passes through the output section 324 and the second optic fiber 400 and is delivered to the photodetector 500. The photodetector 500 detects the light intensity variation so as to obtain the value of the electrical field surrounding the electro-optic modulator 300.

Figure 4:
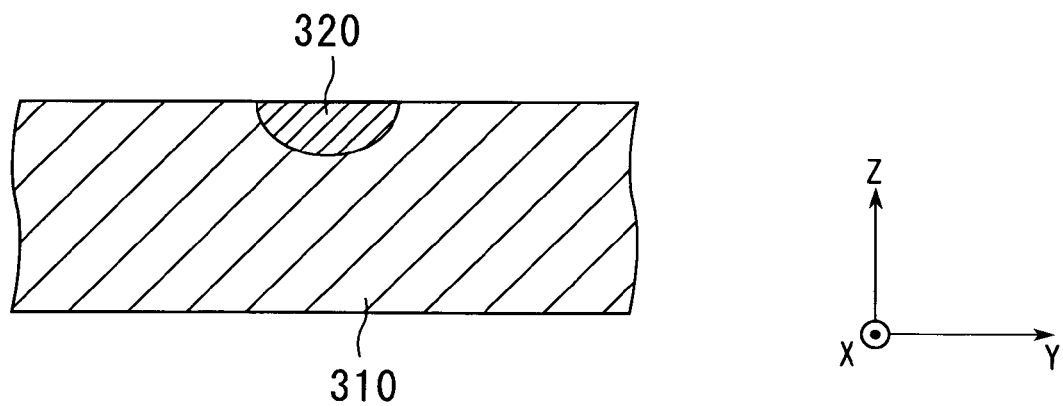
FIG. 4 is a cross-sectional view showing a step in a forming process of the electro-optic modulator of FIG. 2.
Figure 5:
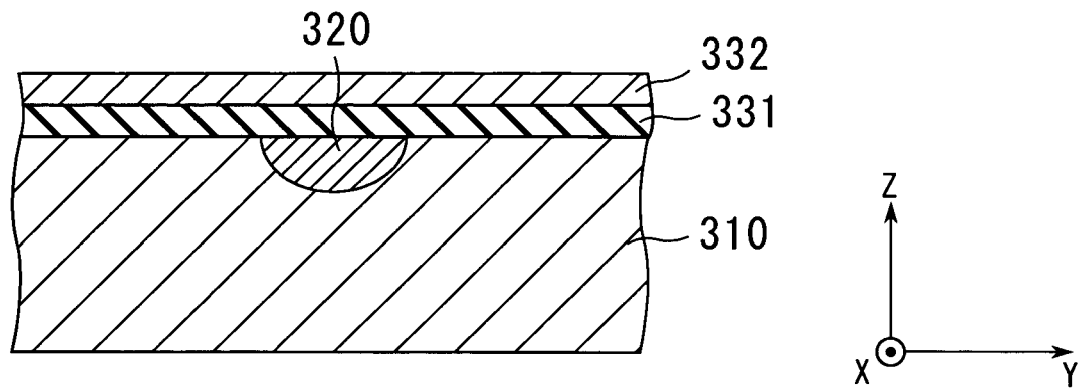
FIG. 5 is another cross-sectional view showing a step in a forming process of the electro-optic modulator of FIG. 2.
Figure 6:
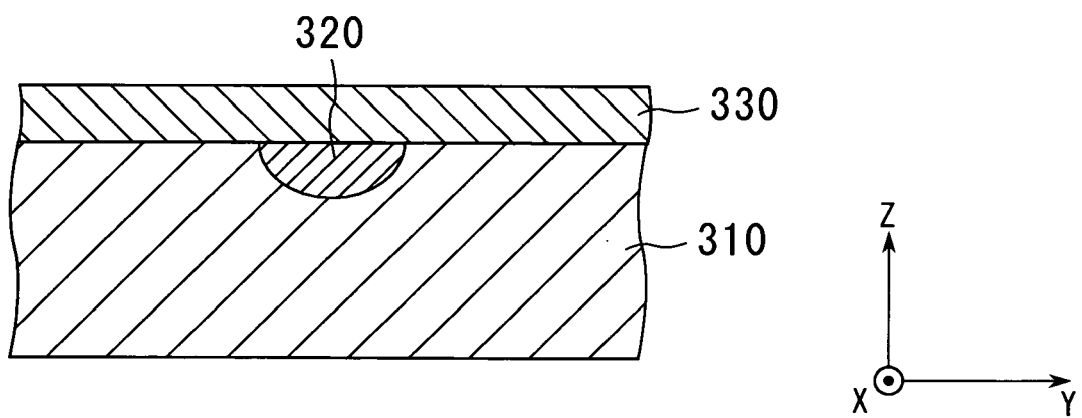
FIG. 6 is another cross-sectional view showing a step in a forming process of the electro-optic modulator of FIG. 2.

With reference to FIGS. 4 to 6, a fabrication method of the electro-optic modulator 300 according to the first embodiment will be explained below.

As shown in FIG. 4, the material of the optical waveguide 320, which is Ti in this embodiment, is patterned onto the LiNbO$_3$ substrate 310 and is diffused into the LiNbO$_3$ substrate 310 so that the optical waveguide 320 is formed in the substrate 310.

As shown in FIG. 5, the transparent insulator film 331 and the transparent conductor film 332 are laminated to form the laminated films on the substrate 310 and on the optical waveguide 320. In the illustrated laminated films, the transparent insulator film 331 is positioned below the transparent conductor film 332 but the transparent insulator film 331 may be positioned above the transparent conductor film 332.

In this embodiment, each of the transparent insulator film 331 and the transparent conductor film 332 has a thickness of 100 nm. Independently, each of the transparent insulator film 331 and the transparent conductor film 332 may have a thickness of from 20 nm to 200 nm. In this embodiment, the transparent insulator film 331 and the transparent conductor film 332 have refractive indexes, each of which is smaller than that of the optical waveguide 320.

It should be noted here that the formation of the transparent insulator film 331 and the formation of the transparent conductor film 332 are carried out separately from each other. The transparent insulator film 331 may be formed by means of vacuum deposition, vacuum evaporation, ion plating or sputtering. Also, the transparent conductor film 332 may be formed by means of vacuum deposition, vacuum evaporation, ion plating or sputtering. According to the present embodiment, it is easy to control a thickness of each of the transparent insulator film 331 and the transparent conductor film 332. This means that the method of the present embodiment is completely different from JP-A H09-197357. For example, if the mixture layer of the prior art JP-A H09-197357 is formed by means of vacuum deposition, vacuum evaporation, ion plating or sputtering, there is required a special apparatus in which two different materials, a conductor and an insulator, are deposited, ion-plated or sputtered simultaneously. The special apparatus makes the fabrication cost high. In this respect, the present embodiment does not require such a special apparatus. For example, the formation of the transparent insulator film 331 or the transparent conductor film 332 can be carried out by means of an existing apparatus for vacuum deposition, vacuum evaporation, ion plating or sputtering. Therefore, according to the present embodiment, the fabrication cost becomes lower than that of JP-A H09-197357.

In this embodiment, the transparent insulator film 331 is made of a transparent insulator oxide. Specifically, the transparent insulator oxide is made of $SiO_2$. The transparent insulator oxide may be made of at least one of $SiO_2$, borosilicate glass, $Al_2O_3$, $TiO_2$, and $ZrO_2$. The transparent conductor film 332 according to the first embodiment is made of a transparent conductor oxide. Specifically, the transparent conductor oxide is made of ITO. The transparent conductor oxide may be made of at least one of ITO, $SnO_2$ and ZnO. Thus, the transparent insulator film 331 and the transparent conductor film 332 are not made of resin material so that the problem of JP-A H08-313577 such as degradation of the resin material does not occur.

It should be noted here that, in the state shown in FIG. 5, there is a clear boundary between the transparent insulator film 331 and the transparent conductor film 332. The clear boundary becomes blurred by the following mutual-diffusion.

As shown in FIG. 6, the laminated films are mutually diffused into each other so that the mutual diffusion layer of the buffer layer 330 is obtained. In this embodiment, the mutual diffusion is carried out by annealing the laminated films comprised of the transparent insulator film 331 and the transparent conductor film 332. In this embodiment, the annealing of the laminated films is carried out in the preferred temperature range of from 500 to 600 degrees centigrade in oxygen atmosphere. The preferred temperature depends on the materials of the laminated films and properties of a mutual diffusion layer as the buffer layer 330.

In this embodiment, the sheet resistance of the buffer layer 330 is adjusted by the thickness of the transparent insulator film 331, the thickness of the transparent conductor film 332 and the annealing conditions. As mentioned above, it is easy to control the thicknesses of the transparent insulator film 331 and the transparent conductor film 332. Therefore, it becomes also easy to control the sheet resistance of the buffer layer 330 so that the sheet resistance of the buffer layer 330 lies in the preferred range from $10^6$ to $10^7$ ohms per square.

After the mutual diffusion process, the first and the second electrodes 341, 342 are formed on the buffer layer 330 so that the electro-optic modulator 300 is fabricated.

With reference to FIGS. 7 to 10, an explanation will be made about an electro-optic modulator according to a second embodiment.

Figure 7:
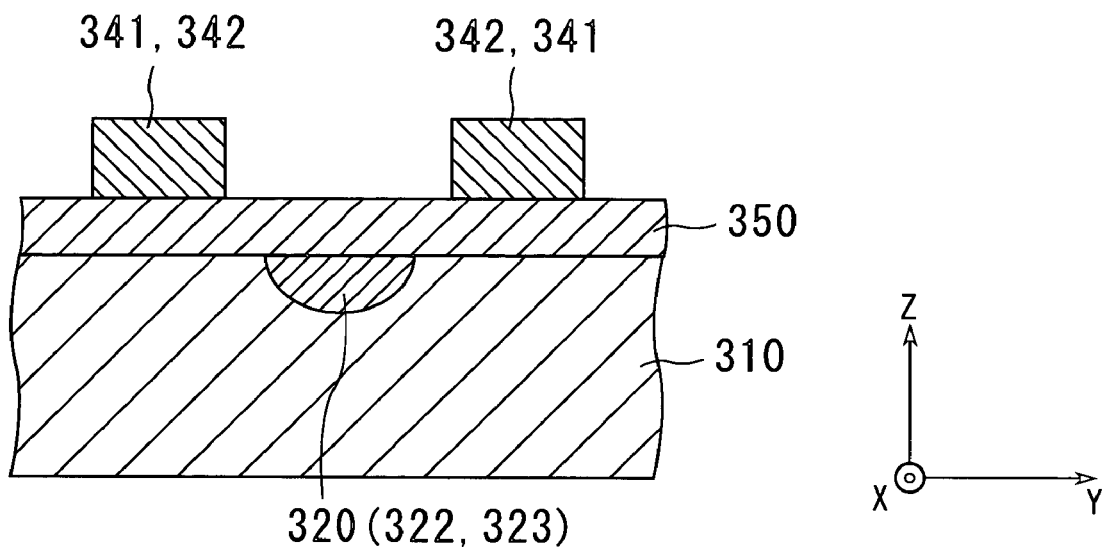
FIG. 7 is a partial, enlarged, cross-sectional view which shows an electro-optic modulator according to a second embodiment of the present invention.

As shown in FIG. 7, the electro-optic modulator of the second embodiment has a similar structure to the first embodiment except for a buffer layer 350. The electro-optic modulator of the second embodiment is fabricated as shown in FIGS. 8 to 10.

Figure 8:
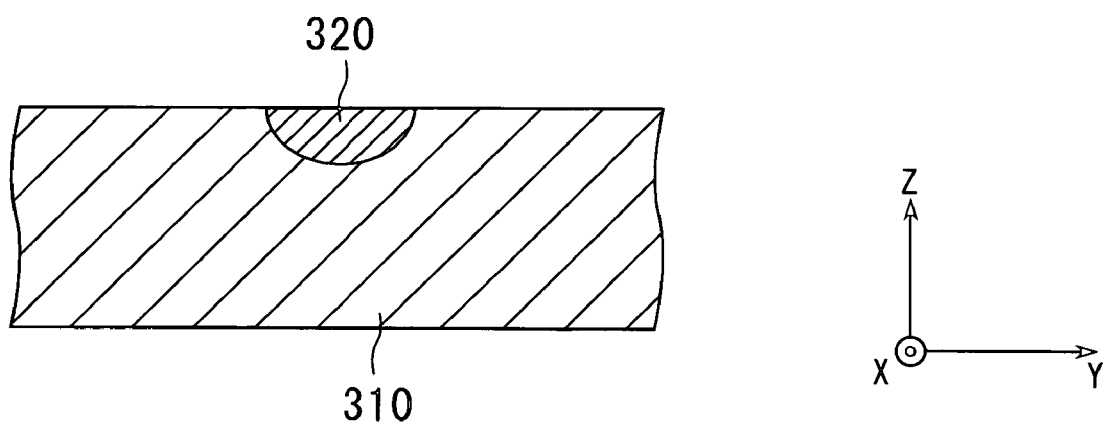
FIG. 8 is a cross-sectional view showing a step in a forming process of the electro-optic modulator of FIG. 7.

As shown in FIG. 8, the material of the optical waveguide 320 is patterned onto the substrate 310 and is diffused into the substrate 310 so that the optical waveguide 320 is formed in the substrate 310.

Figure 9:
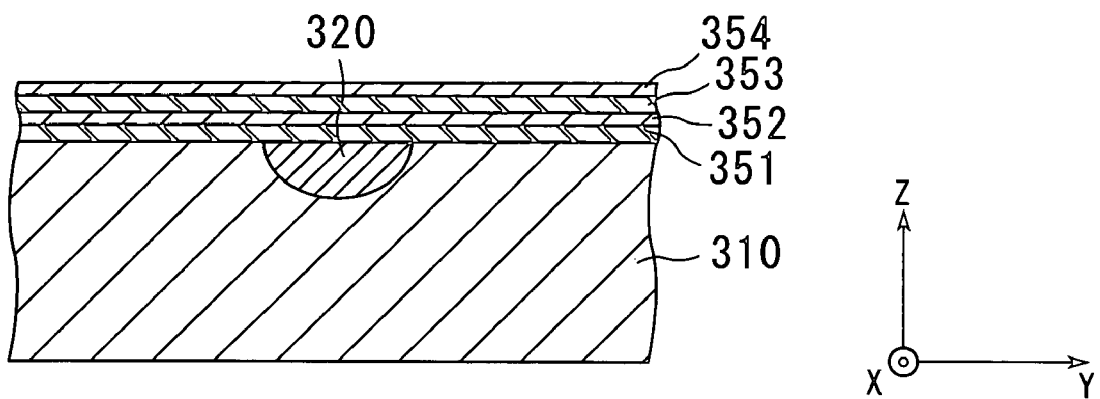
FIG. 9 is another cross-sectional view showing a step in a forming process of the electro-optic modulator of FIG. 7.
Figure 10:
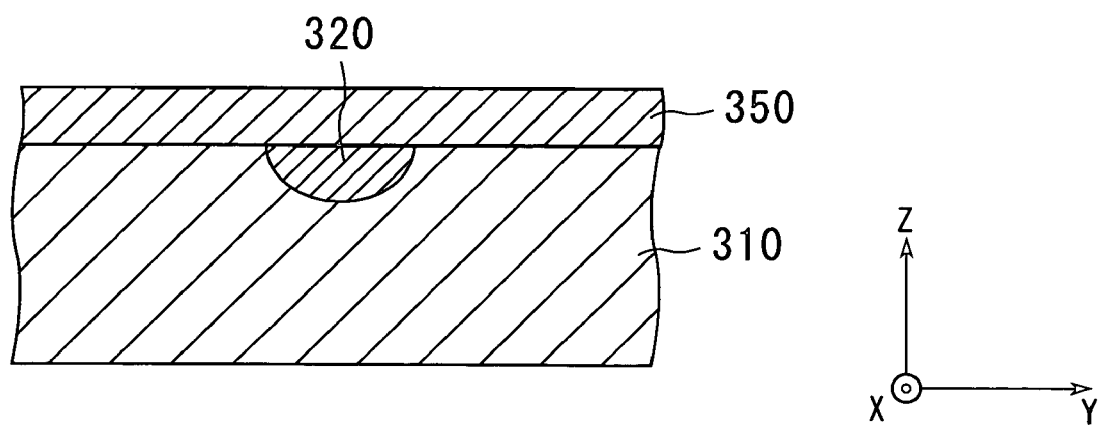
FIG. 10 is another cross-sectional view showing a step in a forming process of the electro-optic modulator of FIG. 7.

As shown in FIG. 9, the transparent insulator films 351, 353 and the transparent conductor films 352, 354 are alternately laminated to form the laminated films on the substrate 310 and on the optical waveguide 320. In the illustrated laminated films, the transparent insulator film 351 is a lowermost film, and the transparent conductor film 354 is an uppermost film. However, the lowermost film may be a transparent conductor film, and the uppermost film may be a transparent insulator film. In this embodiment, the total number of the transparent insulator films and the transparent conductor films is four, namely, even number but may be odd number.

Each of the transparent insulator films 351, 353 and the transparent conductor films 352, 354 may have a thickness belonging to a range from 20 nm to 200 nm. In this embodiment, the transparent insulator films 351, 353 and the transparent conductor films 352, 354 have one and the same thickness but may have thicknesses different from each other. In this embodiment, all of the transparent insulator films 351, 353 and the transparent conductor films 352, 354 have refractive indexes which are smaller than that of the optical waveguide 320.

Similar to the first embodiment, the transparent insulator films 351, 353 may be formed by means of vacuum deposition, vacuum evaporation, ion plating or sputtering. Also, the transparent conductor films 352, 354 may be formed by means of vacuum deposition, vacuum evaporation, ion plating or sputtering.

In this embodiment, the transparent insulator films 351, 353 are made of $SiO_2$. The transparent insulator films 351, 353 may be made of at least one of $SiO_2$, borosilicate glass, $Al_2O_3$, $TiO_2$, and $ZrO_2$. The transparent conductor films 352, 354 are made of ITO. The transparent conductor films 352, 354 may be made of at least one of ITO, $SnO_2$ and ZnO.

As shown in FIG. 10, the laminated films are mutually diffused into each other so that the mutual diffusion layer of the buffer layer 350 is obtained. Similar to the first embodiment, the mutual diffusion of the second embodiment is carried out by annealing the laminated films comprised of the transparent insulator films 351, 353 and the transparent conductor films 352, 354. The annealing conditions may be the same as the first embodiment.

In this embodiment, the sheet resistance of the buffer layer 350 is adjusted by the number of the transparent insulator films 351, 353, the number of the transparent conductor films 352, 354, the thickness of each of the transparent insulator films 351, 353, the thickness of each of the transparent conductor films 352, 354 and the annealing conditions. According to the present embodiment, it becomes also easy to control the sheet resistance of the buffer layer 350 so that the sheet resistance of the buffer layer 350 lies in the preferred range from $10^6$ to $10^7$ ohms per square.

After the mutual diffusion process, the first and the second electrodes 341, 342 are formed on the buffer layer 350 so that the electro-optic modulator according to this embodiment can be obtained.

The preferred embodiments of the present invention will be better understood by those skilled in the art by reference to the above description and figures. The description and preferred embodiments of this invention illustrated in the figures are not to intend to be exhaustive or to limit the invention to the precise form disclosed. They are chosen to describe or to best explain the principles of the invention and its applicable and practical use to thereby enable others skilled in the art to best utilize the invention.

While there has been described what is believed to be the preferred embodiment of the invention, those skilled in the art will recognize that other and further modifications may be made thereto without departing from the sprit of the invention, and it is intended to claim all such embodiments that fall within the true scope of the invention.

The invention claimed is:

1. An electro-optic modulator comprising: a substrate made of a material which has an electro-optic effect; an optical waveguide which comprises at least a pair of optical paths and is formed in the substrate; a buffer layer which includes transparent and is formed on the substrate and on the optical waveguide, wherein the buffer layer is a mutual diffusion layer made from laminated films which comprise at least one transparent insulator film and at least one transparent conductor film, wherein the laminated films are mutually partially diffused into each other, and wherein the buffer layer has a structure in which there is no clear boundary between the at least one transparent insulator film and the at least one transparent conductor film; and
   electrodes which are formed on the buffer layer and are arranged to cause refractive index changes in the pair of optical paths in response to electrical fields surrounding the electro-optic modulator.

2. The electro-optic modulator according to claim 1, wherein the buffer layer has a sheet resistance ranging from $10^6$ to $10^7$ ohms per square.

3. The electro-optic modulator according to claim 1, wherein the laminated films comprise a plurality of transparent insulator films and a plurality of transparent conductor films.

4. The electro-optic modulator according to claim 1, wherein the buffer layer has a distribution of sheet resistances in a thickness direction of the buffer layer.

5. The electro-optic modulator according to claim 1, wherein the laminated films are mutually partially diffused into each other by annealing the laminated films.

6. The electro-optic modulator according to claim 1, wherein the at least one transparent insulator film is made of a transparent insulator oxide.

7. The electro-optic modulator according to claim 6, wherein the transparent insulator oxide is made of at least one of $SiO_2$, borosilicate glass, $Al_2O_3$, $TiO_2$, and $ZrO_2$.

8. The electro-optic modulator according to claim 1, wherein the at least one transparent conductor film is made of a transparent conductor oxide.

9. The electro-optic modulator according to claim 8, wherein the transparent conductor oxide is made of at least one of ITO, $SnO_2$ and ZnO.

10. An electrical-field sensor comprising:
    the electro-optic modulator according to claim 1;
    a light source optically coupled to the electro-optic modulator; and
    a photodetector optically coupled to the electro-optic modulator.

* * * * *